United States Patent [19]

Chen

[11] Patent Number: 5,789,475
[45] Date of Patent: Aug. 4, 1998

US005789475A

[54] ADIPIC ACID MODIFIED-IONOMERS HAVING IMPROVED PROPERTIES AND PROCESSABILITY

[75] Inventor: John Chu Chen, Hockessin, Del.

[73] Assignee: E. I. du Pont de Nemours and Company, Wilmington, Del.

[21] Appl. No.: 801,690

[22] Filed: Feb. 18, 1997

[51] Int. Cl.$^6$ .................................................. C08K 5/09
[52] U.S. Cl. .................................... 524/300; 524/301
[58] Field of Search ................................. 524/300, 301

[56] References Cited

U.S. PATENT DOCUMENTS 3,264,272  8/1966  Rees .......................... 260/78.5
4,104,216  8/1978  Clampitt ..................... 260/23 AR

FOREIGN PATENT DOCUMENTS 48-70757  9/1973  Japan .

*Primary Examiner*—Jeffrey T. Smith
*Attorney, Agent, or Firm*—Monte R. Browder

[57] ABSTRACT

Ionomers based on ethylene/unsaturated carboxylic acid copolymers are modified with from 0.5 to 15 weight percent adipic acid. The modified-ionomers have improved melt flow and melt processing behavior over unmodified ionomers having a comparable level of neutralization of acid groups present. Certain mechanical properties are improved, particularly stiffness, abrasion resistance and low temperature izod impact.

7 Claims, No Drawings

ADIPIC ACID MODIFIED-IONOMERS HAVING IMPROVED PROPERTIES AND PROCESSABILITY

BACKGROUND OF THE INVENTION

1. Field of the Invention

This invention relates to adipic acid-modified-ionomers. The modified-ionomers have improved processability as well as certain improved properties.

2. Background of the Invention

Copolymers which are dipolymers of ethylene and the unsaturated carboxylic acids methacrylic or acrylic acid, are well known. Commercially such dipolymers typically contain at least about 75 weight percent, and up to about 96 weight percent, ethylene. They are used for molding, packaging and some adhesive applications. Examples of such ethylene/acid-copolymers include those sold under the trade name, Nucrel®, which are produced by E. I. du Pont de Nemours and Company. Such ethylene/acid-copolymers are disclosed in U.S. Pat. No. 4,351,931 (Armitage), the parent disclosure of which was filed back in 1961.

Acid-copolymers of this type are also used to prepare 'ionomers', wherein the carboxylic acid units of the copolymers are partially neutralized with metal ions. Such ionomers are sold by E. I. du Pont de Nemours and Company under the trade name Surlyn®. These resins are thermoplastic in the melt. Partial neutralization is used because fully neutralized acid-copolymers are known to, and are disclosed as having, intractable melts. Ionomers have separate utility and significantly different properties from the non-neutralized ethylene/acid-copolymer 'precursors'. Ionomers were first disclosed in U.S. Pat. No. 3,264,272 (Rees). The ions form a sort of 'ionic crosslink' bond at low temperatures, but the ions in these ionic crosslink bonds are sufficiently labile at melt temperatures, provided there remain some non-neutralized acid groups, that they allow thermoplastic melt processability. Nevertheless, ionomers are considerably more viscous than their acid-copolymer precursors.

Typically, ionomers are made from acid-copolymer precursor copolymers having a melt index of from about 20 to 300 grams/10 minutes. Neutralization results in an increase in viscosity, or a decrease in melt flow, commonly measured as melt index (MI). Useful ionomers can have a level of neutralization of between 10 and 90 percent, preferably 25 and 75 percent, and their MI falls between 0.1 and about 20 grams/10 minutes, but preferably lower than about 3 grams/10 minutes. The higher the acid-copolymer precursor MI, the higher the MI of the ionomer for a given level of neutralization (percent of acid groups neutralized). Higher MI generally allows more ready processing. Nevertheless, many of the attractive properties associated with ionomers compared with acid-copolymers depend on higher levels of neutralization, and hence poorer flow. In addition, lower MI of the acid-copolymer precursor is often more desirable because this relates to the underlying polymeric chain length, which ionic crosslinking does not change significantly. The reality is that neutralization to an MI of 3.0 or less is highly desirable and ionomers with MIs of less than 1.0 have particularly good properties. At these MI levels however, processability is considerably reduced compared with higher MI ionomers.

U.S. Pat. No. 4,104,216 (Clampitt) describes ionomers modified with 5–50 weight percent of a 19-11C long chain (un)saturated fatty acid as 'plasticizer'. The product has higher MI, but lower glass transition temperature, and lower stiffness.

Japanese patent application No. 48/70757 discloses ionomers modified with a high level of a low molecular weight saturated or unsaturated carboxylic acid or salt or anhydride, specifically 10 to 500 parts per 100 parts by weight of ionomer. The carboxylic acid may have 1 to 100 hydrocarbon carbon chain units. Stearic, citric, oleic and glutamic acid and/or salts are exemplified. The acid compounds specifically disclosed include 38 carboxylic acids or metal salts, but do not include adipic acid. The useful additives are likened to plasticizers, comparison being made with plasticization of poly(vinyl chloride) having 'appropriate flexibility' and improved processability at high temperatures.

There is a need for ionomers which have improved processability and other properties, but which are not plasticized in the sense of reduced modulus and stiffness, and which do not have deficiencies in other properties.

SUMMARY OF THE INVENTION

The invention depends on the discovery that one particular acid, adipic acid is unique in its ability to increase melt flow and improve other properties of an ionomer, as manifest in increased MI and improvement in other properties such as stiffness, relative to an ionomer based on the same acid-copolymer precursor, and having a comparable level of neutralization of all acid groups present.

Specifically, there is provided a composition which is an adipic acid-modified-ionomer, which comprises;

(A) an acid-copolymer, or an ionomer which is prepared by neutralizing an acid-copolymer precursor, the acid-copolymer or acid-copolymer precursor comprising a polymer of;
  (a) ethylene,
  (b) 4 to 25 weight percent of (meth)acrylic acid,
  (c) 0 to 40 weight percent of a C1–C8-alkyl alkyl acrylate, the total comonomer content (b) plus (c) not exceeding 50 weight percent, the ionomer being formed by neutralization of from 10 to 90 percent of the total number of carboxylic acid units in the acid-copolymer precursor with sodium, lithium, zinc, magnesium, calcium ions, or a mixture of any of these, and (B) an amount of adipic acid or the sodium, lithium, zinc, magnesium, calcium or mix of any of these, salt of adipic acid, such that adipic moiety is present at a level of from 0.5 to 15 weight percent calculated as free adipic acid in the adipic acid-modified ionomer, provided the level of neutralization of the final adipic acid-modified-ionomer, calculated as the percent of total acid groups from the acid-copolymer or acid-copolymer precursor (A), and from the adipic acid or salt (B), which are neutralized, is also between 10 and 90 percent.

DETAILED DESCRIPTION OF THE INVENTION

In this disclosure the term copolymer is used generically to include polymers containing two, three, or more comonomer units. The term dipolymer or terpolymer, etc., is used when referring to a copolymer having a specific number of comonomers. Following common terminology for copolymers, they are said to 'contain' or 'have' or be 'of' a given comonomer, meaning that the comonomer is copolymerized directly into the chain as comonomer derived units; not, of course, that they actually contain monomer, other than very small residual levels. The copolymerized monomer units are referred to as 'in-chain' units, and the polymer commonly referred to as a 'direct' or 'interchain' copolymer meaning directly polymerized rather than modified by graft copolymerization.

The unsaturated monocarboxylic acid monomer in the acid-copolymer or acid-copolymer precursor can be either methacrylic acid, acrylic acid or both. These three possibilities are conveniently referred to in the disclosure by using the term 'ethylene/(meth)acrylic acid copolymers'. When these polymers are referred to generally, they are simply called acid-copolymers. An acid-copolymer is referred to as an acid-copolymer precursor if it to be made into a 'conventional' ionomer, that is to say, in the context of this application, an ionomer which has not been modified with adipic acid. When a conventional ionomer is modified with adipic acid (or salt) it is referred to herein as an adipic acid-modified-ionomer or, more briefly, just as a modified-ionomer. The blend consists of a polymer portion and what is referred to in this disclosure as an 'adipate moiety' or 'adipic acid moiety'. The latter two terms are equivalent and used interchangeably.

The precursor acid-copolymer for the ionomers of this invention may contain about 4 to about 25 weight percent acrylic or methacrylic acid. Below about 4 percent, the ionomer resulting from neutralization will have minimal ionomer qualities, and the effects of adipic acid modification will be minimal. Preferably the level of acrylic or methacrylic acid is 8 percent or above.

The acid-copolymer or acid-copolymer precursor may also contain up to 40 weight percent of an alkyl acrylate having an alkyl group with from 1 to 8 carbons. This is designated a C1–C8-alkyl alkyl acrylate. If an alkyl acrylate is present, n-butyl acrylate is preferred.

The acid-copolymers or acid-copolymer precursors which form the basis of the adipic acid-modified-ionomers of this invention can be prepared by standard free-radical copolymerization methods, using high pressure, operating in a continuous manner. Monomers are fed into the reaction mixture in a proportion which relates to the monomer's reactivity, and the amount desired to be incorporated. In this way, uniform, near-random distribution of monomer units along the chain is achieved. Unreacted monomers may be recycled. Polymerization in this manner is well known, and is described in U.S. Pat. No. 4,351,931 (Armitage), which is hereby incorporated by reference. At high acid levels, it is an advantage to use so-call 'co-solvent' technology to prevent phase separation of monomer and polymer due to high polarity differences between the polymer formed and the monomer mix. The latter will contain much less acid monomer than the polymer, because of generally high reactivity of acid monomers. Even using this technology, it is difficult to prepare polymers with more than 25 weight percent acid. Co-solvent technology is fully described in U.S. Pat. Nos. 5,028,674 (Hatch et al.) and 5,057,593 (Statz), both of which are also hereby incorporated by reference.

The total comonomer content is also limited. While there is an upper limit to each of the comonomers present separately, the total comonomer content will not exceed 50 weight percent. Above 50 weight percent total comonomer, polymerization becomes difficult.

Conventional ionomers may be made from acid-copolymer precursors according to the method described in U.S. Pat. No. 3,264,272 (Rees) which is hereby incorporated by reference. Typically, acid-copolymer precursors are transformed into ionomers, by blending a melt of the acid-copolymer with a melt salt or other metal compound which provides metal ions in the ionomer, the anion of the salt, such as an acetate ion, being volatized off as acetic acid, thus not remaining in the polymer. Suitable metal ions include sodium, lithium, zinc, magnesium and calcium or a mixture of any of these.

Adipic acid has been found unique in modifying ionomers. It improves melt flow, yet improves other properties such as stiffness, izod impact resistance, and increases freezing point which aids in processability, in addition to the improvement in processability due purely to improved melt flow. Certain other acids also appear to increase melt flow by an approximately similar amount on a molar acid basis (i.e., beyond that expected from de-neutralization), but they plasticize in that they decrease stiffness, or they do not increase stiffness significantly, and reduce or do not increase freezing point significantly. Other acids may be either too volatile, or too high in molecular weight, requiring significantly more of the compound, (on an equal number of moles of carboxyl groups basis) particularly if a monobasic acid. Overall, adipic acid appears to be highly suitable.

Adipic acid salts may also be used, but only those salts of those metals which can readily be used to form ionomers. As noted above, such metals include sodium, lithium, zinc, magnesium, calcium or a mixture of any of these. If a metal salt having a metal ion other than the one used to form the ionomer is used, a mixed metal ionomer will, of course, result. Free adipic acid is preferred. A metal adipate can be blended directly with an acid-copolymer precursor, in which case the metal ion of the adipate salt provides the ions in the ionomer. This process is somewhat akin to conventional ionomer formation, except that in this case the adipate moiety remains, in contrast to, say, acetic acid from acetates used for conventional ionomers. The amount of adipic acid or salt is between 0.5 and 15 weight percent, calculated as free adipic acid, based on the combined weight of the polymer and adipic acid or salt of adipic acid, provided the percent neutralization of the final composition, (calculated as the percent of total acid groups present both from the polymeric component and the from the adipic acid component) which are neutralized, is between 10 and 90 percent.

In order to appreciate why it is possible to prepare the adipic acid-modified-ionomer by combining acid-copolymer with a metal adipate, or by combining already-neutralized conventional ionomer with adipic acid and/or metal adipate, it is necessary to understand the essential nature of ethylene/carboxylic acid conventional ionomers and of the modified-ionomers of this invention. The ethylene/acid-copolymers are polymer chains of ethylene with (more or less) random in-chain units derived from (meth)acrylic acid. On partial neutralization with metal ions to form conventional ionomers, it is known in the art that the ions, rather than rigidly associating with just one carboxylic acid unit, are labile, and can form ion clusters which act as ion crosslinks. When free adipic acid is added, additional carboxylic acid units are now present. The metal ions from the ionomer, being labile, can now associate with carboxylic acid groups of the adipic acid as well as with those on the polymer chains. To what extent they are randomly associated with all carboxylic acid units will depend on factors such as the acidity of each carboxylic acid unit, as well as the particular conditions which allow clustering and lability of ions. It is clear that if a metal adipate salt is melt mixed with an acid-copolymer, the resulting mix should be similar to melt mixing adipic acid to an already neutralized conventional ionomer. Both will give an adipic acid-modified-ionomer, consisting of polymer chains, adipate units and metal ions which are, as noted, labile to an extent dependent on the exact condition of the mix.

In terms of preparation of the modified-ionomer of the present invention, by far the most preferred method is to mix, by normal melt mixing techniques such as in an extruder at normal melt temperatures for the polymer, a conventional ionomer with adipic acid. Much less preferred is to mix acid-copolymer with a metal adipate, even though the same product should result for compositions having the same amounts of the same base polymer, ion or ion mix and adipic acid component, assuming the melt has had time to allow equilibration of ions completely, in the same way. On a weight basis of course, more metal adipate will be required for a given level of adipate moiety.

When a conventional ionomer is mixed with adipic acid, the ratio of the number of ions to the number of carboxylic acid groups in the resulting modified-ionomer will be different from the ratio in the conventional starting ionomer, because no ions are lost, but acid groups are added. In terms of percent neutralization, which is this ratio in percentage form, it is clear that the percent neutralization in the modified-ionomer will be less than in the conventional ionomer from which it is formed. Thus, it is possible to consider the adipic acid addition as de facto de-neutralization. With de-neutralization one would expect increased melt flow or MI, since, in the reverse process, when neutralizing an acid-copolymer, MI continuously decreases with increasing levels of neutralization.

It has been found, surprisingly however, that the melt flow increases more than would be expected based on the calculated degree of neutralization. That is to say, if a modified-ionomer is compared with a conventional ionomer of the same degree of neutralization, as defined above, the modified ionomer has higher flow or MI. The degree of neutralization is not the critical reference point however. The critical reference point is that of mechanical and other properties. If the modified-ionomer had higher MI than a conventional ionomer having an equal level of neutralization, but poorer properties, (comparable for instance to a lower percent neutralized ionomer), then little would have been achieved. It is always possible to achieve higher flow and poorer properties by using lower levels of neutralization. In fact, it has been found that, not only do mechanical properties not suffer, but in several important instances they actually improve. Thus there are two types of improvement in several instances, though the level of both types of improvement can depend on the particular metal ion and the acid level in the acid-copolymer precursor.

As noted above, the level of adipic moiety is such that there would be 0.5 to 15.0 weight percent, calculated as free adipic acid, in the modified-ionomer. Below 0.5 percent, the effect is insignificant. Preferably the amount is from 1.0 to 9.0 weight percent, and most preferably from 1.0 to 5 weight percent.

Blending of polymer and adipate source (free acid or salt) may be carried out using any melt mixing equipment, such as an extruder, at melt temperatures of from 160° to 280° C. At temperatures as high as 290° C., the final modified-ionomers have shown little or no volatiles loss, despite the 153° C. melting point of adipic acid. This is presumably because the adipic acid is rapidly tied up as salt or half salts which have lower volatility. Alternatively, it is possible to add adipate salts to acid-copolymer, thus making ionomer and incorporating adipic acid at the same time. The former is preferable, because mixing is more assured, since the melting point of adipic acid is about 153° C., compared with much higher melting points for adipic acid bi-metal salts or half salts. A third alternative for preparing the modified-ionomers will be to melt blend adipic acid and acid-copolymer, then ionomerize in the conventional way, using conventional metal compounds such as metal acetates, hydroxides or oxides. Yet another method of preparation will be to blend in adipic acid and ionomerize at the same time with, say, metal acetates, hydroxides or oxides. That is to say, the modified ionomer may be prepared in one step from acid-copolymer (precursor), adipic acid and a metal ion source, with only one melt mixing process.

The level of neutralization for the modified-ionomer, calculated as percent of total acid groups present which are neutralized, is from 10 to 90 percent. This is the same level of neutralization which is useful for conventional ionomers. Just as with conventional ionomers however, the preferred level of neutralization is from 25 to 75 percent, and most preferred from 25 to 60 percent. If a conventional ionomer and free adipic acid are used to prepare the modified-ionomer, to obtain the desired level of neutralization of the final modified-ionomer, for a particular desired level of adipic acid, one can readily calculate the level of neutralization required in the conventional ionomer. Alternatively, if one has access only to an ionomer with a given level of neutralization, one can readily know what level of overall neutralization will result for any given level of adipic acid added. If bi-metal adipate salts are used, the level of neutralization will, of course, increase rather than decrease. One can readily see that various ways are possible to obtain any given combination of adipic acid level and percent neutralization in the final modified-ionomer, and it is within the skill of the artisan to calculate the amount of various starting materials required to prepare a particular desired modified-ionomer.

It is not completely understood why low molecular weight acids, particularly adipic acid, increase melt flow beyond the change expected based on the percent neutralization resulting in the final material. When adipic acid is added to acid-copolymer, there appears to be no such change in melt flow, suggesting there may be little plasticization of the polymer by the adipic acid moieties. Without committing to any particular theory, it may be that the ions distribute themselves in such a way between the adipic carboxylic units and polymer carboxylic units that the number of effective ion crosslinks at melt temperatures is reduced. If the ions associate, in the melt, preferentially with the low molecular weight adipate moiety, then the number of crosslinks due to ions in the polymer portion of the mix is reduced, thus increasing flow. At the same time, at ambient temperatures, properties may be affected by a quite different distribution of metal ions amongst the various carboxylic acid units present. Again, without committing to any particular theory, if ions in the solid state associate preferentially with the polymer portion rather than the adipate moiety, then solid state properties might be expected to be similar to those of unmodified ionomer.

In fact, however, while many properties are indeed comparable in the solid state, there are some property changes, which are generally a significant improvement and advantage for many end-use purposes. Adipic acid or its salts appears to nucleate the polymer and increase the overall level of crystallinity and rate of crystallization on cooling. The apparent nucleating effect of adipic acid is in contrast to other acids tried. The effect of apparent adipic acid nucleation, in combination with what seem to be ion distribution effects, provides various property benefits. There is an increase in stiffness, improved impact properties, particularly at low temperatures, and an elevation in the freezing point which results in improved moldability in terms of mold cycle time. By contrast, other acids such as heptanoic acid make the polymer more flexible. Such flexibilizing can be compared with the effect of stearic acid which also flexibilizes, as discussed in the section on related art. The increase in freezing point and crystallinity with adipic acid improves molding performance beyond that which results from increased melt flow. This is because polymer can 'set up' or solidify in the molds faster.

There is no particular preference in the level of acid comonomer in the acid-copolymer of the modified-ionomer. Various acid levels in conventional ionomers are preferred for various reasons and end uses, and these preferences will generally also apply to modified-ionomers. However, there is a difference in the effect of adipic acid on low acid copolymer ionomer and high acid copolymer ionomers. There appears to be a greater flow advantage (quite apart from the effects of de-neutralization) with lower acid level acid-copolymer based ionomers than with high acid level acid-copolymer based ionomers. On the other hand, the higher the acid level, the greater appears to be the change in stiffness and toughness. The reasons for this are not completely clear. The various property changes when adipic acid moiety is present appear to be the result of a combination of ion distribution differences between modified and unmodified polymer, and nucleation effects in the modified polymer.

EXAMPLES

Test Procedures

Melt Index, (MI) was measured using ASTM D-1238 at 190° C., using a 2160 gram weight Hardness was measured using ASTM D-2240.

Tensile Strength, elongation and tensile modulus were measured using ASTM D-882.

Flexural Modulus was measured using ASTM D-790.

Notched Izod Impact was measured using ASTM D-256.

Elmendorf Tear Strength was measured using ASTM D-1922.

Haze was measured using ASTM D-1003.

Tabor Abrasion Resistance was measured using ASTM D-1044.

Vicat Softening Point was measured using ASTM D-1525.

Melting Point, $T_m$ and Freezing Point, $T_c$ and Heat of Fusion were measured using Differential Scanning Calorimetry, (DSC). Samples were allowed to stand at room temperature for two weeks before measurements. Heating and cooling were both at 10° C. per minute. Melting point, measured on the heating cycle, and freezing point on the cooling cycle, correspond to the peak of the endo- or exotherm. Heat of fusion on melting or cooling can be assessed from the area under the endo or exotherm curve. Precise values are sometime difficult to assess however, because of uncertainty and variability in the base line of the DSC scan, and for this reason, values are not quoted in the tables. Values for heat of fusion were generally found to increase significantly, most particularly the values of heat of fusion on cooling. As an example, the heat of fusion of ionomer I6 (see table for composition) increased from about 42 to about 72 joules/gram on adding 5 weight percent adipic acid. The more adipic acid added, generally the higher the increase in heat of fusion.

The compositions of this invention may be advantageously used where improved cycle time during melt processing, improved abrasion resistance, and improved stiffness are an advantage. Such uses include packaging films, extrusion coatings, ski boots, cleated shoe soles, heel counters, replacement for thermoplastic urethane footwear components, bowling pins, golf ball covers and floor tiles. They will find particular utility in powder coatings and in mineral filled compositions, since these applications can benefit significantly from improved processability.

Blend production procedure

Extrusion blends were made using either a 30 mm. or a 28 mm. Twin-Screw Extruder fitted with mixing screws. While melt temperatures of 160° to 280° C. were possible, generally melt temperature was between 180° and 230° C. Blends made in a Haake mixer were made in a standard manner for such a mixture, typically using a melt temperature of about 200° C. It is probably inevitable that blends made using slightly different melt temperatures, or in different equipment will differ slightly in measured properties, most particularly in properties such as tensile strength and elongation which are typically highly sensitive to any non-uniformity in the composition, so that slight differences in the amount or uniformity of mixing can have a noticeable effect. Nevertheless, most properties shown are believed to be generally representative of the composition shown, irrespective of how they are prepared, provided the level of mixing is reasonably good.

Compositions, Results and Discussion of Results

Table 1 lists the compositions of the various ionomers and acid copolymers used in making the different modified-ionomers. Table 2 lists various properties measured on different compositions. The table is divided into sections for easy comparison of data. Controls or comparative compositions are designated with a suffix -C. Table 3 lists further properties of blends and comparison or control compositions.

The first series of examples in Table 2, (Examples 1 and 1C-5C), compare the effects on a sodium ionomer of an ethylene/methacrylic acid copolymer containing 15 weight percent acid, of adding adipic acid, heptanoic acid or the precursor ethylene/15% methacrylic acid copolymer. The table shows (example 1) the predicted MI on adding 3% adipic acid, assuming equilibration of ions, that is to say uniform distribution between the polymer and the adipate moiety, and that predicted assuming the adipic moiety acts as an ion sink, where the ions associate with it preferentially up to a 'saturation' level i.e., where all the adipate moiety is di-metal adipic acid salt. Whatever ions remain are associated with the polymer, and are the ions which determine the percent neutralization of the polymer carboxyls for MI calculation purposes. The MIs listed refer to the MI of an unmodified ionomer having (i) the degree of neutralization which the polymer portion of the modified-ionomer would have assuming 'equilibration', or more exactly, metal ions associated with the polymer and adipate moiety in proportion to the number of carboxyl groups in the polymer and in the adipate moiety. Thus if the degree of neutralization of all carboxyl groups is 36%, then 'equilibration' means the modified ionomer is a mix of 36% neutralized ionomer and adipic acid moiety having 36% of its acid groups neutralized. Or (ii), the degree of neutralization the modified-ionomer would have, assuming all the ions possible become associated with the adipate moiety, as noted above. These two alternative distribution of ions are referred to in the table for (i) as 'Equil.' and for (ii) as 'As salt'. In the latter case, the polymer itself will obviously be far more de-neutralized and thus have higher calculated MI. The two MIs correspond to idealized extremes of ion distribution. In general, for different ionomers, values can only be estimated very approximately because it is necessary to have master curves for the MI versus degree of neutralization for all the various acid copolymers (i.e., having different MIs, acid levels, different acids and neutralized with different metal ions). Such curves are not uniformly well established for all the variations possible. The ranges of MI shown for (i) and (ii) take into consideration the uncertainty of these MI/neutralization curves for different polymers/ions, and also the variation in measurement typically found, as well as MI variation due to differences in moisture levels. The values are reasonable values which serve as a sufficient guide to know that there is a flow improvement beyond that expected for 'equilibrium' de-neutralization. However, the ranges shown should be regarded only as a 'best guess' estimate. The values were estimated for many but not all compositions.

The values given for example 1, for (i) and (ii) ('Equil' and 'as salt' in the table are ~1.5–2 g/10 minutes, and ~4–6 grams/10 minutes. In fact the MI found for example 1 was 5.1 grams/10 minutes. Thus the adipic acid-modified ionomer has an MI far higher than would be expected simply by equilibrium de-neutralization (i.e., 1.5–2 g/10 minutes). This example is compared with examples where the ionomer is diluted with its acid-copolymer precursor to MIs of about 1.9 and 5.2 (comparative examples 2C and 3C). Results for example 1 show that adipic acid has a strong effect on increasing flexural modulus (to 73.1 kpsi) and freezing point (to 72° C.). No comparable effect occurs with the acid-copolymer precursor-diluted ionomer. There is thus a freezing point and flexural modulus advantage when compared, either at the expected equilibration MI (i.e. that due solely to equilibrium de-neutralization), or at the actual MI found. There is thus a net flow advantage together with a modulus and freezing point advantage.

When an amount of heptanoic acid having the same equivalents of acid as 3% adipic acid is added (5.23 weight %), it is seen (example C4) that this acid has a quite similar effect on increasing MI, but quite the opposite effect on flexural modulus (down to 39.1), and very little effect on the freezing point compared with adipic. Heptanoic acid causes no increase in flow over the expected value when added to acid-copolymer (example C5), suggesting that any increase in melt flow in ionomers is not due to plasticization, but to ion distribution effects (between the polymer and the adipic acid moiety).

The next series of examples (6C–9C and 9-2C and 2–4 and 4-2) compares the effect of 3 weight percent adipic acid on sodium, lithium, magnesium and zinc ionomers based on a 12 weight percent methacrylic acid acid-copolymer precursor. The effect on flow is similar. Each shows a flow advantage over an expected equilibration MI value of about 1.5 to 2.0 g./10 minutes. There is also an effect on flexural modulus, (except for the zinc ionomer) and on the Vicat softening point (for all four ionomers). For flexural modulus the effect is less for the lithium ionomer, less again for the magnesium ionomer. The zinc ionomer is an exception and shows no increase, and actually shows a slight decrease in modulus from 54.9 to 48.7 kpsi, even though zinc ionomers show improvements in most other properties. The reason for the unusual behavior for zinc ionomer is not understood. However, conventional zinc ionomers by themselves are known in the art to differ from other ionomers in having lower modulus in general. Prior art suggests however that conventional zinc ionomers blended with other conventional ionomers, particularly with sodium ionomers and lithium ionomers, may not show the distinctly different properties that zinc ionomers by themselves seem to show. Values for the un-neutralized acid copolymer precursor are shown for reference.

The third series of examples (5–9 and 10C–17C), were prepared to examine flow for a wide variety of acids, on a sodium ionomer and a zinc ionomer both based on a 15 weight percent methacrylic acid acid-copolymer precursor. Adipic acid is effective in increasing flow in comparison to that predicted for equilibrium de-neutralization levels (compare the actual MI and the estimate for 'equil.' MI). However, benzoic acid and heptanoic acid, both of which have a strong effect on improving flow relative to the predicted equilibrium value for the sodium ionomer (I6), have only a very small effect on the zinc ionomer. Oxalic acid with the zinc ionomer has almost no effect in increasing flow, and methacrylic acid (i.e. liquid monomer) has no effect with either ionomer.

The next series of examples (10–12 and 18C), compares the effect of 3 weight percent adipic acid on sodium ionomers based on acid precursor polymers having 10, 15 and 20 weight percent methacrylic acid (I1, I6 and I8 respectively). At equal weight percent adipic acid, there is a decreasing effect on flow for increasing level of methacrylic acid in the precursor for the ionomer (the MI of the ionomers themselves are fairly similar, see table 1). While a difference in final MI is to be expected because ionomers having higher acid levels to start with will be de-neutralized proportionately less for a constant level of equivalents of acid added, the effect may go beyond this. It may be that as the acid level in the precursor polymer increases, the degree to which adipic acid increases flow, whatever the cause of increaded flow, is reduced. The series also shows the flow of I6 ionomer with C12 diacid (dodecanedioic acid). This acid improves flow comparably for a comparable molar acid level, but this requires an increased amount of acid because of the higher equivalent weight of the C12 diacid.

Table 3 shows certain other properties. The first series (13–18 and 19C–20C) show that for sodium or zinc ionomers, haze increases comparably with increasing adipic acid level. For some uses, increased haze will be a disadvantage. Water sensitivity as measured by water pickup, is however not much affected by adipic acid addition. The value for I6 with 1% adipic acid appears to be a spurious value.

The next series (examples 19–21 and 21C–23C) shows certain other properties. Note particularly the very large increase in flexural modulus at −20° C., on adipic acid addition. Note also the increase in izod impact values both at room temperature and at −20° C. The effect on properties are compared for ionomers based on a 10 and a 20 weight percent methacrylic acid acid-copolymer precursor (I1 and I2 with 10 weight percent, and I8 with 20 weight percent). The effect on these properties appears to be stronger for the high acid acid-copolymer precursor based ionomer. Tear strength is also shown. While there is a dramatic increase in tear strength on addition of adipic acid, some may be attributed to de-neutralization, since un-neutralized acid copolymers are known to have higher tear strength. (compare tear strength of I2 ionomer which is a lower neutralized ionomer than I1). However, best estimates suggest the increased tear strength goes beyond that expected for a lower neutralization level ionomer.

Certain other properties not shown in the tables have been measured. Hardness shows little effect as a result of adipic acid addition. Abrasion resistance increases significantly in some cases however. Thus ionomer I8 showed a room temperature weight loss in a Tabor abrasion test of 59.3 mg./1000 cycles, while the same ionomer with 3 weight percent adipic acid showed an abrasion weight loss of only 9.3 mg./1000 cycles. Zinc ionomers again appear to be different. In a test on a low acid acid-copolymer precursor based zinc ionomer, adipic acid gave no improvement in abrasion resistance. Once again, zinc appears alone to be exceptional. Some initial data suggest however that zinc ionomer blends with other ionomers may show some improvement in abrasion behavior.

One of the most dramatic effects seen was the decrease molding cycle time for adipic acid-modified-ionomer. In a molding trial with a Van Dorn 200 ton injection molding machine, using a 4 inch×4 inch by 4 mm. plaque mold, ionomer I1 was compared with the same ionomer with 3 weight percent adipic acid. Melt temperature could be decreased from 340° to 315° F., and cycle time was reduced 37 percent. For ionomer I8 modified with 3 weight percent, the same melt temperature decrease was possible, and cycle time was reduced 34 percent.

In some testing, a decrease in certain impact properties (Spenser impact) on films made from modified ionomer was seen, and some decrease in ultimate tensile strength, though there was much scatter in the data obtained. Other data have suggested no decrease—in some cases even an increase in tensile strength. Tensile strength is highly sensitive to heat history, and in thin films, different levels of crystallinity compared with thicker test specimens might be expected to produce different results.

Overall however, there is a major improvement in flow and many mechanical properties on addition of a relatively small amount of adipic acid in comparison with ionomers of similar level of neutralization, based on that estimated for equilibrium de-neutralization by the adipic acid. Differences are seen for different acid levels in the precursor polymer, and for different metal ions in the ionomer.

TABLE 1

ACID COPOLYMERS USED IN BLENDS

| Polymer #/Type | Monomer composition | MI | Ion/% Neutr. |
|---|---|---|---|
| A1/Acid copolymer | E/MAA(10 wt. %) | 35 | None |
| I1/Ionomer | E/MAA(10 wt. %) | 1.3 | Na, 54% |
| I2/Ionomer | E/MAA(10 wt. %) | 4.5 | Na, 37% |
| A2/Acid copolymer | E/AA(12 wt. %) | 83 | None |
| I3/Ionomer | E/AA(12 wt. %) | 1.06 | Na, ~50% |
| I4/Ionomer | E/AA(12 wt. %) | 0.93 | Li, ~50% |
| I5/Ionomer | E/AA(12 wt. %) | 0.94 | Mg, ~50% |
| I5-2/Ionomer | E/AA(12 wt. %) | 0.89 | Zn, ~50% |
| A3/Acid copolymer | E/MAA(12 wt. %) | 1.56 | None |
| A4/Acid copolymer | E/MAA(15 wt. %) | 60 | None |
| I6/Ionomer | E/MAA(15 wt. %) | 0.9 | Na, 59% |
| I7/Ionomer | E/MAA(15 wt. %) | 0.7 | Zn, 58% |
| I8/Ionomer | E/MAA(20 wt. %) | 1.0 | Na, 46% |

E = Ethylene;
MAA = methacrylic acid;
AA = Acrylic acid.
% Neutr. + % neutralization.

TABLE 2

PROPERTIES OF IONOMER BLENDS AND COMPARISON EXAMPLES

| Ex.# | Composition | Prep. | MI | MI Predicted Equil; As salt | Flex Mod. (kpsi) | Tensile Strength (kpsi) | Mp; Fp (°C.) | Vicat (°C.) |
|---|---|---|---|---|---|---|---|---|
| 1C | I6 | — | 1.0 | na | 57.9 | 5.5 | 90; 52 | — |
| 2C | I6 + 13.7% A4 | Haake | 1.9 | ~1.5–2; na | 58.9 | 5.3 | ~same | — |
| 1 | I6 + 3% Adipic | Haake | 5.1 | ~1.5–2; ~4–6 | 73.1 | 4.1 | 93; 72 | — |
| 3C | I6 + 35.5% A4 | Haake | 5.2 | ~5–5.5; na | 60.2 | 4.6 | 93; 58 | — |
| 4C | I6 + 5.23% Heptanoic | Haake | 5.7 | ~1.5–2; ~4–6 | 39.1 | 4.1 | 93; 57 | — |
| 5C | A3 + 5.23% Heptanoic | Haake | 2.3 | ~2–2.5; na | — | — | — | — |
| 6C | A2 | na | 83 | na | 20 | — | 102; 77 | 75.2 |
| 7C | I3 | Extr. | 1.06 | na | 60 | — | 96; 58 | 74.8 |
| 2 | I3 + 3% Adipic | Extr. | 5.7 | ~1.5–2; | 100 | — | 99; 78 | 82.4 |
| 8C | I4 | Extr. | 0.93 | na | 60.8 | — | — | 75.4 |
| 3 | I4 + 3% Adipic | Extr. | 6.5 | ~1.5–2; ne | 87.8 | — | — | 79.1 |
| 9C | I5 | Extr. | 0.94 | na | 55.4 | — | — | 74.6 |
| 4 | I5 + 3% Adipic | Extr. | 5.4 | ~1.5–2; ne | 70.4 | — | — | 79.1 |
| 9-2C | I5-2 | Extr. | 0.89 | na | 54.9 | — | — | 78.2 |
| 4-2 | I-5-2 + 3% Adipic | Extr. | 11.8 | ~1.5–2; ne | 48.7 | | | 80.2 |
| 5 | I6 + 3% Adipic | Haake | 4.0 | ~1.5–2; ~4–6 | — | — | — | — |
| 6 | I6 + 5% Adipic | Haake | 11.6 | ~2–3; ~14–16 | — | — | — | — |
| 7 | I6 + 7.1% Adipic | Haake | 26.6 | ~3–4; ~55–75 | — | — | — | — |
| 10C | I6 + 5% Benzoic | Haake | 3.2 | ~1–2; ~3–5 | — | — | — | — |
| 11C | I6 + 8.1% Benzoic | Haake | 9.1 | ~2–3; ~13–17 | — | — | — | — |
| 12C | I6 + 8.57% Heptanoic | Haake | 14.4 | ~2–3; ~13–17 | — | — | — | — |
| 13C | I6 + 5.85% Methacrylic | Haake | 2.50 | ~2–3; ~13–17 | — | — | — | — |
| 8 | I7 + 5% Adipic | Haake | 6.34 | 2.5–3.5; 13–17 | — | — | — | — |
| 9 | I7 + 8% Adipic | Haake | 48.4 | ~5–6; ~55–65 | — | — | — | — |

TABLE 2-continued

PROPERTIES OF IONOMER BLENDS AND COMPARISON EXAMPLES

| Ex.# | Composition | Prep. | MI | MI Predicted Equil; As salt | Flex Mod. (kpsi) | Tensile Strength (kpsi) | Mp; Fp (°C.) | Vicat (°C.) |
|---|---|---|---|---|---|---|---|---|
| 14C | I7 + 8.1% Benzoic | Haake | 4.5 | 2.5–3.5; 13–17 | — | — | — | — |
| 15C | I7 + 8.57% Heptanoic | Haake | 3.88 | 2.5–3.5; 13–17 | — | — | — | — |
| 16C | I7 + 1.68% Oxalic | Haake | 1.61 | ~1.3–2; 4–5 | — | — | — | — |
| 17C | I7 + 5.9% Methacrylic | Haake | 1.54 | 2.5–3.5; 13–17 | — | — | — | — |
| 10 | I1 + 3% Adipic | Extr. | 10.1 | ne ne | — | — | — | — |
| 11 | I6 + 3% Adipic | Extr. | 3.15 | ne ne | — | — | — | — |
| 12 | I8 + 3% Adipic | Extr. | 1.8 | ne ne | 87.1 | — | — | — |
| 18C | I6 + 5% C12 Diacid | Extr. | 4.0 | ne ne | — | — | — | — | na = not applicable.
Flex.Mod. = Flexural Modulus.
Prep.: Mode of Preparation
not measured indicated by a dash (—).
Extr.: made by extrusion blending in twin screw extruder.
% Adipic refers to weight percent of Adipic acid. Likewise with other acids.
ne: not estimated.

TABLE 3

OTHER PROPERTIES OF IONOMER BLENDS AND COMPARISON EXAMPLES

| Ex # | Composition | Prep. | MI | Flex Mod. RT/−20° C. (kpsi) | Elmend. Tear MD/TD (g/mil) | Izod gate/end RT: −20° C. (ft.lbs./in.) | Haze % 2 mil. casting | Water Pickup* |
|---|---|---|---|---|---|---|---|---|
| 19C | I6 | Extr. | | | | | 2.46 | 0.38 |
| 13 | I6 + 1% Adipic | Extr. | | | | | 2.58 | 0.92 |
| 14 | I6 + 3% Adipic | Extr. | | | | | 2.83 | 0.28 |
| 15 | I6 + 5% Adipic | Extr. | | | | | 3.46 | 0.24 |
| 20C | I7 | Extr. | | | | | 1.68 | 0.23 |
| 16 | I7 + 1% Adipic | Extr. | | | | | 2.04 | 0.33 |
| 17 | I7 + 3% Adipic | Extr. | | | | | 2.54 | — |
| 18 | I7 + 5% Adipic | Extr. | | | | | 3.78 | 0.37 |
| 21C | I1 | Extr. | 1.3 | 29.3; 91 | 22; 32 | 7.7/10.2; 8.6/13.2 | | |
| 19 | I1 + 3% Adipic | Extr. | 10.1 | 30; 136 | 75; 88 | 12.7/12.7; 11.8/17.3 | | |
| 22C | I2 | Extr. | 4.5 | 29; 99 | 59; 56.6 | 10.3/11.8; 11.0/15.3 | | |
| 23C | I8 | Extr. | 1.0 | 70; 129 | 28; 41 | 9.8/13.7; — — | | |
| 20 | I8 + 3% Adipic | Extr. | 2.1 | 89; 140 | 23; 68 | 13.4/18.5; — — | | |
| 21 | I8 + 5% Adipic | Extr, | 4.2 | 84; 165 | 134; 150 | 19.8/21.8; — — | | |

*3 mil. thick cast film, treated for 7 days at room temperature, at 50% Relative Humidity.
RT = room temperature. MD and TD are machine direction and transverse direction.

I claim:

1. A composition, which is an adipic acid-modified-ionomer, which comprises;
(A) an acid-copolymer, or an ionomer which is prepared by neutralizing an acid-copolymer precursor, the acid-copolymer or acid-copolymer precursor comprising a polymer of;
  (a) ethylene,
  (b) 4 to 25 weight percent of (meth)acrylic acid,
  (c) 0 to 40 weight percent of a C1–C8-alkyl alkyl acrylate, the total comonomer content (b) plus (c) not exceeding 50 weight percent, the ionomer being formed by neutralization of from 10 to 90 percent of the total number of carboxylic acid units in the acid-copolymer precursor with sodium, lithium, zinc, magnesium, calcium, or mix of any of these metal ions, and
(B) an amount of an adipic acid moiety which is adipic acid or the sodium, lithium, zinc, magnesium, calcium, or mix of these metal, salt of adipic acid, such that adipic acid moiety is present at a level of from 0.5 to 15 weight percent calculated as free adipic acid in the adipic acid-modified ionomer, provided the level of neutralization of the final adipic acid-modified-ionomer, calculated as the percent of total acid groups from the acid-copolymer or acid-copolymer precursor (A) and from the adipic acid moiety (B) which are neutralized, is also between 10 and 90 percent.

2. The composition of claim 1, wherein the level of (meth) acrylic acid is from 8 to 25 weight percent.

3. The composition of claim 2 wherein (A) is an ionomer and (B) is adipic acid.

4. The composition of claim 3, wherein the level of neutralization of the final adipic acid-modified-ionomer is between 25 and 75 percent.

5. The composition of claim 4, wherein the level of adipic acid moiety in the adipic acid-modified-ionomer is from 1 to 5 weight percent.

6. The composition of claim 3 wherein the metal in the ionomer (A) is selected from the group consisting of sodium, lithium, magnesium, calcium, a mixture of any of these and a mixture of zinc with any of these.

7. A process to prepare an adipic acid-modified-ionomer comprising blending in the melt in an extruder, a) acid-copolymer precursor, b) adipic acid, and c) a metal ion sources of sodium, lithium, zinc, magnesium and calcium, or mix of any of these, which is an oxide, hydroxide, acetate or mix of these, in one pass through the extruder.

* * * * *